J. FARMWALT.
Horse Rake.
No. 40,793. Patented Dec. 1, 1863.
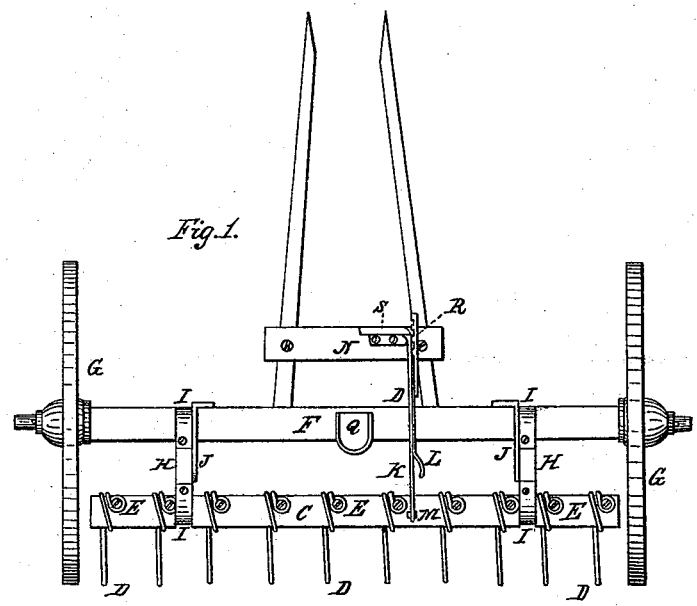
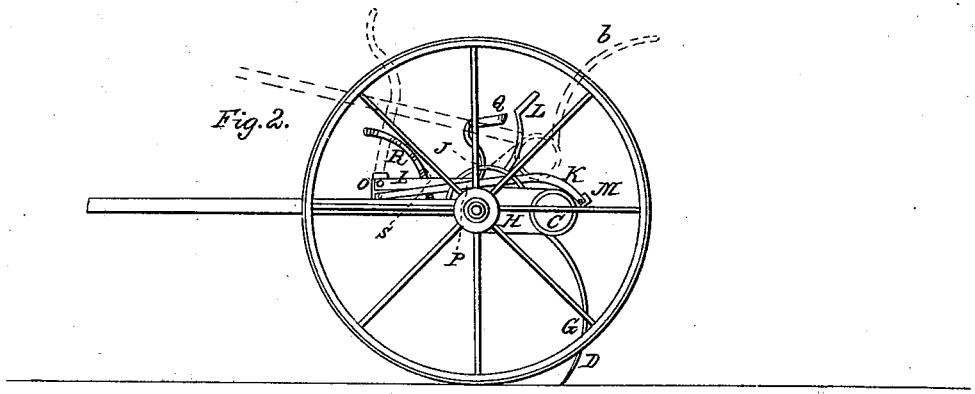
Witnesses:
Inventor:
Jacob Farmwalt

UNITED STATES PATENT OFFICE.

JACOB FARMWALT, OF GERMAN TOWNSHIP, HOLMES COUNTY, ASSIGNOR TO ARTHUR GRAHAM, OF CLARK'S P. O., COSHOCTON COUNTY, OHIO.

IMPROVEMENT IN HORSE-RAKES.

Specification forming part of Letters Patent No. 40,793, dated December 1, 1863.

*To all whom it may concern:*

Be it known that I, J. FARMWALT, of German township, in the county of Holmes and State of Ohio, have invented certain new and useful Improvements in Horse-Rakes; and I do hereby declare that the following is a full and exact description of the construction and operation of the same, reference being had to the annexed drawings, making part of this specification, in which—

Figure 1 is a plan view; Fig. 2, an end view.

Like letters denote like parts in the drawings.

To the round wooden bar or shaft C, Fig. 1, is connected a series of metallic spring-teeth, D, which are secured to the bar by having one end bent into a loop or eye, E, through which a screw is driven into the bar or shaft C. The teeth are then bent or wound around the bar, giving thereby additional strength and spring.

The axle-tree F is connected with the two wheels G G, and upon which wheels the machine is mounted for operation. To this axle-tree the shaft with the series of teeth is hung or connected by the two arms H H. These arms at the place of connection with the axle-tree F and bar C form a joint, (indicated at I I I I.) By means of these joints the rake is moved up or down, each end separately or together, thereby adjusting the rake to the unevenness of the ground as may be required, or in case of obstructions occurring at one end of the rake the end will rise up and pass over it, while the other end remains upon the ground. The joints also aid in discharging the loaded rake. Thus the rake is rendered self-adjusting.

J J are two brace-guides for the purpose of aiding and governing the action of the rake, and also to prevent any lateral tendency of the same.

K and L are two strong levers, K being connected to the bar C of the rake at the point M, so as to form a joint, and the lever L is jointed to the cross-piece N at O. These two levers are connected at P, forming a pivot-joint. By this means a compound lever is made, the purpose of which is to operate the rake while being in use, and is performed in the following manner:

The person using the rake, being seated upon the spring-seat Q, takes hold of the handle of the lever L with the right hand. This lever being connected with the other lever, K, at the point P, as before mentioned, on being pulled upward and forward raises also the lever K at the same time and in the same direction. The lever K in turn, being connected by a joint to the bar or shaft C of the rake, as before noted, causes the said bar to turn with the rake from *a* to *b*, or to any point between *a* and *b*, thereby allowing the hay which may have been gathered by the teeth to escape. The hay being thus discharged, the action of the levers is reversed, causing the rake-teeth to be turned to the ground.

In order to retain in any desired position the rake, and for the purpose of moving from place to place, there is attached to the machine the curved rack R, Fig. 2, which is provided with notches to receive the lever L to hold the rake securely in different positions, as may be required in using it. The person raking places his foot upon the end of the lever K at the point *s* and slips it into a slot at the foot of the rack R, which can be readily removed by the foot when required for discharging the loaded rake, and by means of the notched rack the rake-teeth are held in place upon the ground when in operation. The dotted lines in Fig. 2 show the position of the raking apparatus when raised in order to discharge the load of hay and for convenience of moving from place to place when not in operation.

What I claim as my improvement, and desire to secure by Letters Patent, is—

1. The jointed arms H H and brace-guides J J, in combination with the shaft C, provided with spring-teeth, and axle-tree F, when arranged in the manner and for the purpose set forth.

2. The levers K and L, with their respective pivot-joints and rack R, in combination with the shaft C and jointed arms H H, when arranged in the manner as and for the purpose described.

JACOB FARMWALT.

Witnesses:
BENJAMIN HELMUTH,
JOHN F. GRAHAM.